(12) United States Patent
Pleis et al.

(10) Patent No.: US 7,308,608 B1
(45) Date of Patent: *Dec. 11, 2007

(54) RECONFIGURABLE TESTING SYSTEM AND METHOD

(75) Inventors: Matthew A. Pleis, Carnation, WA (US); Bert Sullam, Bellevue, WA (US); Todd Lesher, Poulsbo, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 10/137,497

(22) Filed: May 1, 2002

(51) Int. Cl.
*G06F 11/00* (2006.01)

(52) U.S. Cl. ......................... 714/30; 714/724

(58) Field of Classification Search ............ 714/43–44, 714/56, 30, 724, 734; 713/100; 326/37–39, 326/41; 702/120
See application file for complete search history.

(56) References Cited

U.S. PATENT DOCUMENTS

| | | | | |
|---|---|---|---|---|
| 4,701,907 | A * | 10/1987 | Collins ...................... | 370/371 |
| 5,335,342 | A * | 8/1994 | Pope et al. .................. | 714/38 |
| 5,371,883 | A * | 12/1994 | Gross et al. .................. | 714/38 |
| 5,384,910 | A | 1/1995 | Torres ........................ | 715/810 |
| 5,430,734 | A * | 7/1995 | Gilson ........................ | 714/725 |
| 5,479,603 | A | 12/1995 | Stone et al. ................ | 715/804 |
| 5,544,067 | A | 8/1996 | Rostoker et al. ............. | 703/14 |
| 5,646,544 | A | 7/1997 | Iadanza ....................... | 326/38 |
| 5,729,704 | A | 3/1998 | Stone et al. ................ | 715/804 |
| 5,822,531 | A * | 10/1998 | Gorczyca et al. ........... | 709/221 |
| 5,909,544 | A * | 6/1999 | Anderson et al. ........... | 709/208 |
| 5,931,959 | A * | 8/1999 | Kwiat ........................ | 714/48 |
| 5,974,235 | A | 10/1999 | Nunally et al. ............. | 709/202 |
| 6,198,303 | B1 | 3/2001 | Rangasayee ................ | 326/38 |
| 6,289,478 | B1 * | 9/2001 | Kitagaki ..................... | 714/724 |
| 6,332,137 | B1 * | 12/2001 | Hori et al. ................... | 706/15 |
| 6,460,172 | B1 * | 10/2002 | Insenser Farre et al. ...... | 716/17 |
| 6,542,844 | B1 * | 4/2003 | Hanna ........................ | 702/120 |
| 6,542,845 | B1 * | 4/2003 | Grucci et al. ............... | 702/122 |
| 6,587,995 | B1 | 7/2003 | Duboc et al. ................. | 716/4 |
| 6,614,320 | B1 | 9/2003 | Sullam et al. ................ | 331/46 |
| 6,658,498 | B1 | 12/2003 | Carney et al. ................ | 710/8 |
| 6,661,724 | B1 | 12/2003 | Snyder et al. .............. | 365/211 |
| 6,686,860 | B2 | 2/2004 | Gulati et al. ................ | 341/155 |
| 6,724,220 | B1 * | 4/2004 | Snyder et al. ............... | 326/39 |
| 6,732,347 | B1 | 5/2004 | Bixler et al. ................. | 716/16 |
| 6,792,584 | B1 | 9/2004 | Eneboe et al. ................ | 716/8 |
| 6,799,198 | B1 | 9/2004 | Huboi et al. ................ | 709/203 |
| 6,898,703 | B1 | 5/2005 | Ogami et al. ................. | 713/2 |
| 6,971,004 | B1 | 11/2005 | Pleis et al. .................. | 713/100 |

(Continued)

*Primary Examiner*—Dieu-Minh Le (57) ABSTRACT

One disclosed system and method enables dynamic reconfiguration of an electronic device in association with testing activities in a convenient and efficient manner. In one implementation, the electronic device includes a bus for communicating information, a microprocessor for processing data, a programmable functional component including a plurality of functional blocks programmable to provide a plurality of functions and configurations, and a memory for storing instructions including instructions for causing the programmable functional component to change functions and configurations. The components are programmably configurable to perform a variety of functions. In one example, the memory stores a plurality of configuration images that define the configuration and functionality of the circuit. The information stored in the memory facilitates dynamic reconfiguration of the circuit in accordance with the test harness instructions. Based upon a command from a test computer, the electronic device is automatically reconfigured by the test harness activating different configuration images.

20 Claims, 6 Drawing Sheets

U.S. PATENT DOCUMENTS

| | | |
|---|---|---|
| 7,047,166 B2 * | 5/2006 | Dancea .......................... 703/2 |
| 2002/0055834 A1 * | 5/2002 | Andrade et al. ............... 703/27 |
| 2003/0046657 A1 | 3/2003 | White ........................ 717/105 |
| 2003/0097640 A1 | 5/2003 | Abrams et al. ............. 715/530 |
| 2003/0105620 A1 | 6/2003 | Bowen ......................... 703/22 |
| 2004/0031030 A1 | 2/2004 | Kidder et al. ............... 717/172 |
| 2004/0201627 A1 | 10/2004 | Maddocks et al. .......... 345/762 |
| 2004/0250231 A1 | 12/2004 | Killian et al. ................. 716/18 |

* cited by examiner

RECONFIGURABLE TESTING SYSTEM AND METHOD

FIELD OF THE INVENTION

Embodiments of the present invention generally relate to the field of testing integrated circuits having different configurations.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits usually rely upon components such as integrated circuits to operate in an intended manner. The components are usually subjected to various testing procedures to ensure that they are operating correctly and to provide important information about the integrated circuit. However, testing a wide variety of complex component configurations usually consumes valuable resources and time.

Testing activities are usually implemented with numerous objectives associated with a variety of activities. For example, reliably achieving beneficial results usually depends upon device components operating in an intended manner and testing is often utilized to detect design and/or manufacturing errors that can adversely impact reliable proper circuit operations. One type of testing that is very important is characterization testing. Characterization testing is utilized to measure and analyze characteristics or properties of an integrated circuit during operation (e.g., voltage, current, etc.) and the results are typically used to develop models associated with automated design activities. To get an accurate characterization of a circuit, testing is often performed over a period of time in which an multiple measurements are obtained and average is calculated. Conversely, other types of testing such as experimental testing, often provide the most advantageous benefits when there is rapid comparative feedback on the differences between multiple designs. Experimental testing provides important information useful for a variety of endeavors such as optimizing a design and/or component settings. Retrieving an appropriate amount of characterization and/or optimization information typically means testing a wide variety of integrated circuit configurations which usually consumes significant resources.

Traditional testing approaches are usually very expensive and time consuming. For example, traditional integrated circuits are usually custom designed precisely for a narrow range of applications with a fixed combination of required peripheral functionalities and testing each different integrated circuit design with particular fixed peripherals takes a relatively significant amount of time and resources. Separate and dedicated testing operations are usually required for each different integrated circuit. For example, time and resources are expended removing a circuit configured in a first arrangement from a testing system, inserting a circuit configured in a second arrangement in the testing system and providing another set of instructions for testing the second circuit. In addition, the unique aspects of a each dedication circuit make it difficult to determine which testing instructions are best suited for a particular application. Testing procedures for traditional devices that may attempt to provide some limited configuration flexibility are usually further complicated by requirements to track dedicated programming as changes are made when the device is removed from the testing system.

There are potentially numerous different tests that can be run on an integrated circuit and maintaining information and tracking all the possibilities is very difficult. Some traditional attempts at mitigating the difficulty of testing have utilized external computerized testing equipment to try to assist testing of complex circuits. However, these systems depend upon numerous computer programs for each of the different circuit configurations that can be tested and maintaining these programs is usually resource intensive and time consuming.

SUMMARY

The present invention is a system and method providing dynamic programmability of an electronic device (e.g., a programmable integrated circuit) in association with testing activities in a convenient and efficient manner. In one embodiment, the electronic device includes a bus for communicating information, a microprocessor for processing data, a programmable functional component including a plurality of functional blocks programmable to provide a plurality of functions and configurations, and a memory for storing instructions including test harness instructions for causing changes in the functions and configurations of the programmable functional component. The components are programmably configurable to perform a variety of functions. In one example, the memory stores a plurality of configuration data sets or images that define the configuration and functionality of the circuit. The information stored in the memory facilitates dynamic reconfiguration of the circuit in accordance with the test harness instructions. The electronic device is automatically reconfigured by the test harness activating different configuration images in one exemplary implementation based upon a command from a test computer.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

A system and method for facilitating testing of a dynamically reconfigurable circuit in accordance with an embodiment of the present invention is disclosed. In one embodiment, the system and method provides assistance in testing a variety of circuit designs and subconfigurations. In one exemplary implementation of the present invention, a test harness controls dynamic reconfiguration of an integrated circuit (e.g., microcontroller chip) while in a test environment. In one embodiment, a plurality of configuration data sets or images defining different configurations and functionalities of a circuit are stored in a memory included in the circuit. The exemplary embodiments described herein (e.g., a microcontroller) are not meant to limit the application of the present invention to any specific integrated circuit device or type (e.g., a microcontroller) and embodiments of the present invention may be implemented in a variety of integrated circuits.

Figure 1A:
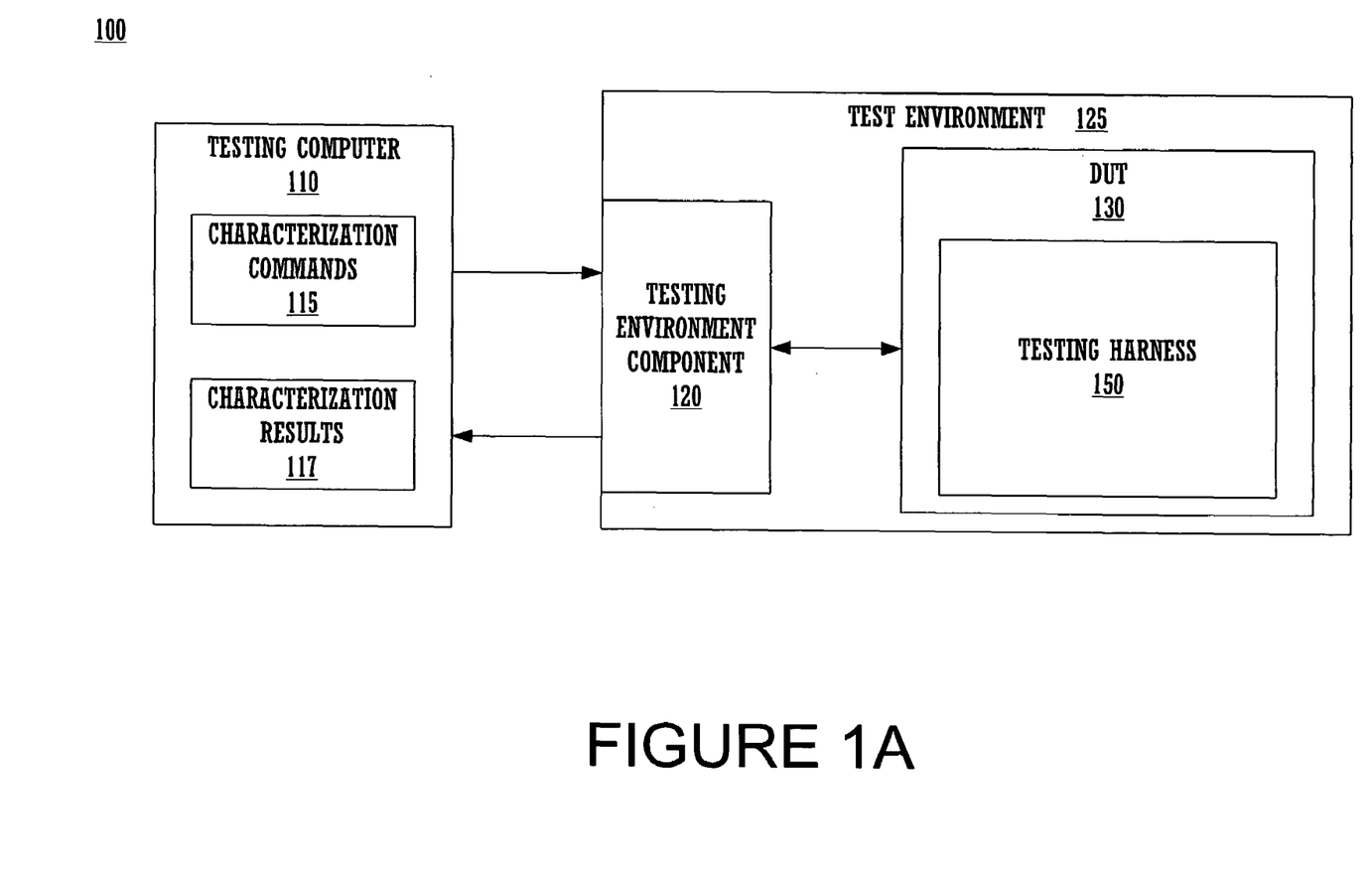
FIG. 1A is a block diagram of a reconfigurable chip testing system, one embodiment of a system upon which embodiments of the present invention may be implemented.

FIG. 1A is a block diagram of reconfigurable chip testing system 100, one example system upon which embodiments of the present invention may be implemented. Reconfigurable chip testing system 100 comprises testing computer 110, testing environment component 120, and a device under test (DUT) 130 which includes test harness 150. Testing computer 110 is coupled to testing environment component 120 which is coupled to DUT 130. In one embodiment, DUT 130 includes a programmably configurable external communication port for communicatively coupling with testing environment component 120. DUT 130 is a microcontroller in one exemplary implementation.

The components of a reconfigurable chip testing system 100 cooperatively operate to automatically configure a programmable device (e.g., a microcontroller) to time multiplex particular possible device configurations therein and retrieve test information (e.g., device characterization information) for each configuration while remaining in a test environment (e.g., generated by testing environment component 120). Test harness 150 controls reconfiguration of DUT 120 (e.g., while in test environment 125). In one embodiment of the present invention, test harness 150 represents a portion of a memory for storing data (e.g., firmware) including instructions for causing a programmable functional component of DUT 130 to change functions and/or configurations. Testing environment component 120 adjusts testing environment factors (e.g., temperature, humidity, power, etc.) and performs as an interface between DUT 130 and exterior devices (e.g., testing computer 110) Testing computer 110 directs test activities. For example, testing computer 110 provides testing environment instructions to testing environment 120, issues testing commands 115 to test harness 150 and receives testing results from testing environment 120.

In one embodiment of the present invention, test harness 150 is a supervisory program that controls the reconfiguration of DUT 130 and also controls the rights of other programs to interact with DUT 130. In one exemplary implementation, test harness 150 "runs" in the background waiting for a reconfiguration triggering event (e.g., a command from the testing computer 110). When test harness 150 detects a reconfiguration triggering event, test harness 150 takes over control of the operations of DUT 130 and prevents other programs (e.g., testing applications) from interacting with DUT 130 while reconfiguration is being implemented. In one exemplary implementation, test harness 150 changes a peripheral input output (I/O) space so that the circuit takes on the characteristics of an indicated peripheral (e.g., a DAC, ADC, UART, etc.).

In one embodiment, the initial configuration of a functional block is set by an external communication instructing DUT 130 to load a particular configuration table (e.g., for a DAC) that defines a configuration of DUT 130. In one embodiment, the configuration table information is stored in a flash memory of a microcontroller included in DUT 130. Alternatively, the configuration table information is externally loaded into the microcontroller under the control of test harness 150 from an external source. In one exemplary implementation, test harness 150 does not completely reprogram DUT 130 but rather reloads the I/O space tables with different values. This permits a higher level of software to deal with the decision to configure a block for a particular function (e.g., a DAC) and one change rebuilds the software entity for the testing software harness.

In one embodiment of the present invention, testing environment component 120 comprises a plurality of devices that contribute to the alteration of testing environment 120 and interfacing communications between DUT 130 and exterior devices. In one exemplary implementation, testing environment component 120 holds environmental conditions constant (even though the configuration of DUT 130 is changed) and in another exemplary implementation testing environment component 120 changes the environmental conditions (even though a configuration of DUT 120 is not changed).

In one embodiment, testing environment component 120 also includes a communication interface for communicating information between exterior components (e.g., testing computer 110) and DUT 130. In one embodiment, testing environment component 120 also performs formatting conversions between different protocol formats. For example, testing environment component 120 converts information communicated to and from the DUT from a universal serial bus (USB) format to a serial peripheral interface (SPI) format and vice versa. In one exemplary implementation, a characterization test command (e.g., one of characterization commands 115) and an environmental setting (e.g., from testing computer 110 is communicated to testing environment component 120. Testing environment component 120 converts the characterization command from a universal serial bus (USB) format to a serial peripheral interface (SPI) and passes it on to test harness 150 via a pin and internal bus of DUT 130. Testing environment component 120 alters testing environment 125 in accordance with the receive environmental setting but does not communicate the environmental setting information to test harness 150.

The present invention is readily adaptable to a variety of testing procedures. In one exemplary implementation, a present invention test harness is utilized in the performance of characterization testing to determine the characteristics (e.g., the accuracy of the DUT, the frequency of the DUT, the performance of the DUT, the DUT's corner characteristics, etc.) for a variety of configurations over a range of different environmental conditions. By facilitating reprogramming of the DUT to implement different hardware devices while remaining in a test environment (e.g., coupled to testing environment component 120), the number of devices that can be characterized in a given period of time is greatly increased. In another exemplary implementation, a present invention test harness is utilized in the performance of experimental testing. In an experimental testing implementation, a test harness facilitates interactive testing with rapid results and greater granularity. In one embodiment, the test harness controls the change of a parameter of a component without completely changing the component. For example, the test harness permits a change in one parameter (e.g., change a capacitor value in a DAC) without necessarily changing the configuration to another component (e.g., an amplifier). This implementation permits the results to provide a more immediate and granular indication of cause and effect impacts associated with particular changes.

Figure 1B:
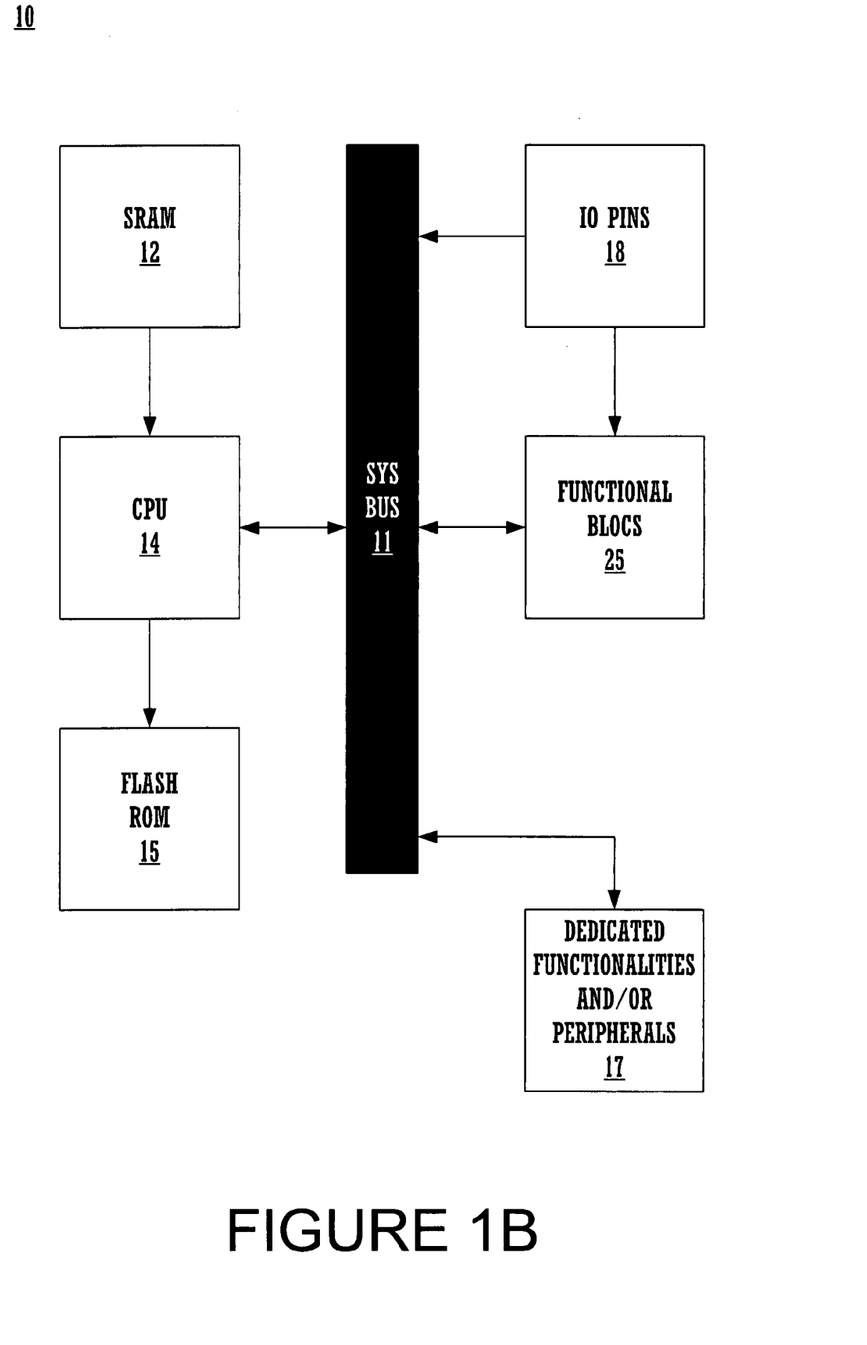
FIG. 1B is a block diagram showing a high level view of an exemplary integrated circuit included in a DUT and upon which embodiments of the present invention may be implemented.

In one embodiment of the present invention, DUT 130 includes an integrated circuit (e.g., a microcontroller). FIG. 1B is a block diagram showing a high level view of an exemplary integrated circuit (e.g., a microcontroller) 10 included in DUT 130 and upon which embodiments of the present invention may be implemented. In one embodiment, integrated circuit 10 includes a communication bus 11, static random access memory (SRAM) 12, central processing unit (CPU) 14, flash read-only memory (ROM) 15, input/output (I/O) pin(s) 18 and programmable functional component 25. Communication bus 11 is electrically coupled to static random access memory (SRAM) 12, central processing unit (CPU) 14, flash read-only memory (ROM) 15, input/output (I/O) pin(s) 18 and functional component 25. Static random access memory (SRAM) 12 stores volatile or temporary data during firmware execution. Central processing unit (CPU) 14 processes information and instructions. Flash read-only memory (ROM) 15 stores information and instructions (e.g., firmware) including instructions associated with test harness 150. In one embodiment of the present invention, flash read-only memory (ROM) 15 also stores configuration image data. Input/output (I/O) pin(s) 18 provides an interface with external devices (not shown). In one exemplary implementation, functional component 25 is programmable to provide different functions and configurations and when integrated circuit 10 is in a testing environment (e.g., coupled to testing environment component 120) the characterization test harness controls the programming of functional component 25.

Figure 2A:
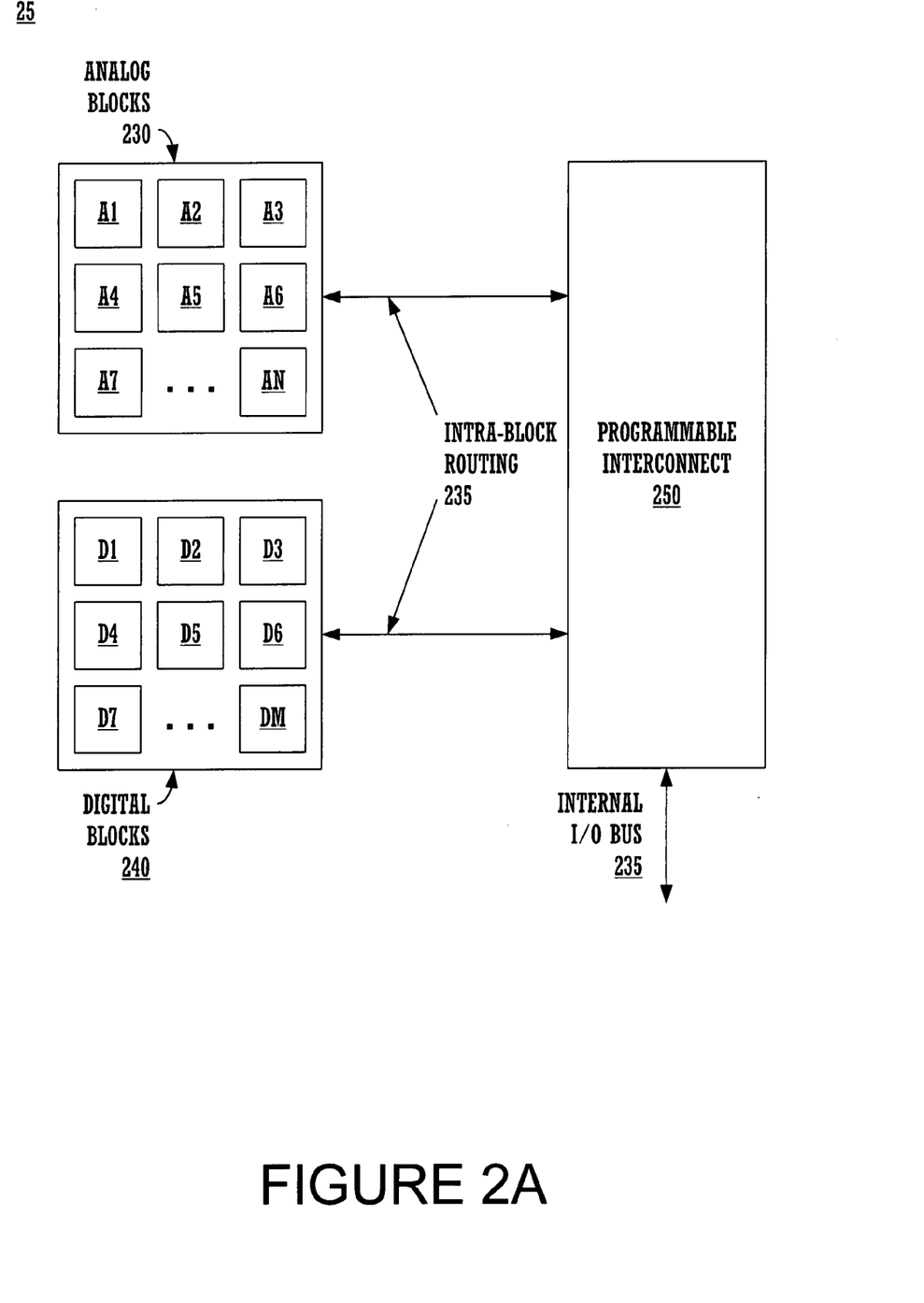
FIG. 2A is a block diagram of one embodiment of a functional component depicted in greater detail.

Referring to FIG. 2A, an embodiment of functional component 25 is depicted in greater detail. In this embodiment, functional component 25 includes an analog functional block 230, a digital functional block 240, and a programmable interconnect 250. In one exemplary implementation, analog functional block 230 includes a matrix of interconnected analog functional blocks A1 through AN. The number N may be any number of analog functional blocks. Likewise, digital block 240 includes a matrix of interconnected digital functional blocks D1 through DM. The number M may be any number of digital functional blocks.

The analog functional blocks A1 through AN and the digital functional blocks D1 through DM are fundamental building blocks (e.g., fundamental circuits) that may be combined in a variety of configurations to accomplish a variety of functions. The functional blocks are programmably configurable to perform different functions. In an exemplary embodiment, the functional blocks include elements with changeable characteristics that can be specified according to the testing to be performed. Inputs received by a functional block are directed through and manipulated by the functional block according to the specified characteristics of the elements. A combination of functional blocks and the characteristics of their elements can be dynamically programmed (e.g., in accordance with instructions from test harness 150) to perform a desired function.

Different combinations utilizing some of the same blocks producing different functions, may exist and be tested at different times within the same system. For example, during a characterization test, a set of functional blocks configured to perform the function of analog-to-digital conversion may sample a signal during test procedures. After processing that signal in the digital domain, some or all of those same blocks (perhaps in conjunction with others) may be recombined in accordance with directions from the test harness in a different configuration to perform the function of digital-to-analog conversion to produce an output signal.

The present invention is readily adaptable for use with numerous functional blocks that are programmably configurable to provide a variety of functions. Exemplary functional peripherals include timers, controllers, serial communications units, Cycle Redundancy Check (CRC) generators, Universal Asynchronous Receiver/Transmitters (UARTs), amplifiers, programmable gain components, digital to analog converters, analog to digital converters, analog drivers, and various filters (e.g., high-, low-, and band-pass). In one exemplary implementation higher order user modules (e.g., modems, complex motor control, sensor devices, etc.) are created with combinations of functional blocks. Co-pending commonly-owned U.S. patent application Ser. No. 10/033, 027, filed Oct. 22, 2001, entitled "PROGRAMMABLE MICROCONTROLLER ARCHITECTURE," which is hereby incorporated by this reference, includes additional details on exemplary implementations of present invention integrated circuits (e.g., integrated circuit 10) and functional components (e.g., functional component 25).

In one embodiment of the present invention, the programmable configuration of integrated circuit 10 components is facilitated by memory (e.g., configuration registers) included in the integrated circuit. In one exemplary implementation of the present invention, the memory includes configuration registers that store a series of logical values (e.g., logical 1 or 0 corresponding to a predetermined voltage level) corresponding to a particular configuration and/or function for an integrated circuit 10 functional block. The series of logic values are programmably configurable (e.g., in accordance with test harness instructions) and in one embodiment of the present invention the logical values loaded in a configuration register are defined by a configuration image (e.g., stored in a system memory 17).

In one embodiment of the present invention, a functional component (e.g., functional component 25) includes registers that are programmably configurable to store configuration data that defines the combination (e.g., electrical coupling) of the functional blocks and the characteristics (e.g., parameters) of the respective functional block elements. When a value is changed in a configuration register in accordance with instructions from test harness 150, the configuration and/or functionality of a corresponding integrated system 10 component is changed accordingly. In one exemplary implementation of the present invention, some functional blocks are configured to affect autonomous system operations, such as interrupts.

Figure 2B:
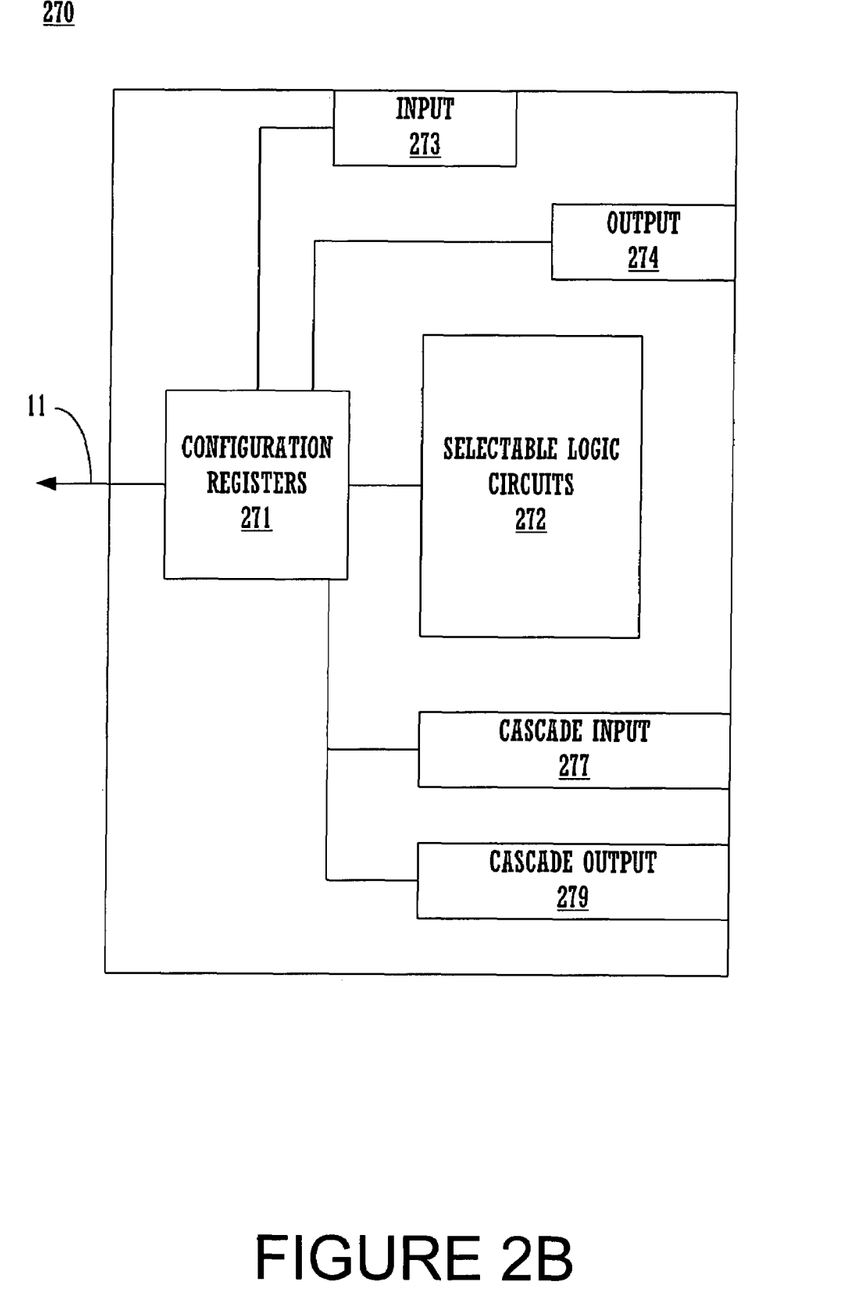
FIG. 2B is a block diagram of one embodiment of a functional block, included in one exemplary implementation of a present invention functional block.

FIG. 2B is a block diagram of functional block 270, one embodiment of a present invention functional block (e.g., A1, D1, etc.). Functional block 270 comprises configuration register(s) 271, selectable logic circuits 272, input 273, output 274, cascade input 277, and cascade output 279. Configuration register(s) 271 is coupled to selectable logic circuits 272, input 273, output 274, cascade input 277, and cascade output 279. Configuration register(s) 271 stores configuration data that defines the configuration and functionality of the other components of functional block 270. In one exemplary implementation, the configuration data is determined by a test harness (e.g., test harness 150). Selectable logic circuits 272 are circuit components that provide a variety of functions in accordance with the configuration data stored in configuration register(s) 271. Input 273 and output 274 provide inputs and outputs respectively to other components of integrated circuit 10 in accordance with the configuration data stored in configuration register(s) 271. Cascade input 277 and cascade output 279 provide inputs and outputs respectively to other cascaded functional blocks in accordance with the configuration data stored in configuration register(s) 271. In one embodiment there are four configuration registers per block, with a capacity of eight bits per register.

A hierarchy of programmable interconnectivity is implemented within system 10. Continuing with reference to FIG. 2A, each individual functional block or unit (e.g., analog blocks A1 through AN and digital blocks D1 through DM) may communicate and interact with each and/or any other functional block or unit and/or communication bus 11. Analog functional blocks 230 and digital functional blocks 240 are communicatively coupled to programmable interconnect 250 by intra-block routing 235 in the present exemplary embodiment. Which functional unit communicates with which other functional unit and/or communication bus 11 is programmably configurable via the programmable interconnect 250 in the present exemplary embodiment. In one exemplary implementation of the present invention, analog functional blocks 230 and digital blocks 240 include internal matrices that facilitate coupling of signals between the function blocks in accordance with programmed configuration data.

In the present exemplary embodiment, programmable interconnect 250 comprises a configuration system and a global mapping system. The configuration system is coupled to communication bus 11 and the global mapping system, which in turn is coupled to functional component 25. The configuration system is programmably configurable to selectively couple with communication bus 11 and/or the global mapping system. The global mapping system facilitates selective coupling of functional blocks included in functional component 25 to other functional blocks and/or communication bus 11. In one exemplary implementation, the global mapping system includes an input global mapping component and an output global mapping component.

In one embodiment of the present invention, programmable interconnect 250 includes configuration registers. The values in the configuration registers are utilized to establish electrically conductive paths between components of integrated circuit 10. In one exemplary implementation of the present invention, the configuration registers facilitate electrical coupling of functional blocks to each other and to other components of integrated circuit 10 (e.g., processor 14).

In one embodiment of the present invention, which functional block and/or other components of integrated system 10 are electrically coupled to an I/O pin is configurably programmable via programmable interconnect 250. In the present exemplary implementation, programmable interconnect 250 is connected via an internal input/output (I/O) bus 236 to a configurable I/O port (e.g., I/O pin(s) 18 in FIG. 1). Each pin of the configurable I/O port is programmably configured on a pin by pin basis. For example, in a first configuration a first I/O port pin (e.g., I/O pin(s) 18) is configured to function as an input and a second I/O pin is configured to function as an output, and in a second configuration the first I/O port pin is configured to function as an output and the second I/O pin is configured to function as an input. The total pin count of a pin-by-pin configurable I/O port (e.g., I/O pin(s) 18) may vary from one application to another, depending on the system device under consideration. An I/O routing modality incorporating features of the present embodiment enables flexibly configurable I/O ports to establish a specific pin locale or pin for the conveyance of particular external signals (e.g., to or from an external device) on pin by pin basis, greatly enhancing testing convenience and system applicability.

In one embodiment of the present invention, the configuration and functionality of an electronic device (e.g., a programmable integrated circuit such as the PSOC microcontroller, available from Cypress MicroSystems, Inc., of Bothell, Wash.) is defined by a configuration image loaded in a memory of the electronic device (e.g., microcontroller 10). In one exemplary implementation of the present invention, a plurality of images are loaded into a memory of an electronic system to facilitate dynamic reconfiguration of the electronic system (e.g., a programmable integrated circuit). In one embodiment of the present invention, a test harness determines the selection of the configuration image from a plurality of configuration images. In one exemplary implementation of the present invention, the plurality of configuration images includes all possible configurations for an electronic device (e.g., a programmable integrated circuit). The information comprising the configuration image may be represented in varying degrees of abstraction. At a low level of abstraction the configuration image is represented by source code (e.g., assembly or machine language) stored as logical values (e.g., logical ones and zeroes) in a memory (e.g., in the programmable integrated circuit). At a higher lever of abstraction the configuration image is represented by textual definitions or graphical images (e.g., in a design tool, in a testing computer, etc.).

In one embodiment, the configurations are data driven and a database stores information associated with possible configurations for a DUT. For example a database stores information on what configurations the functional blocks can potentially have, where the functional blocks are located, what the possible parameters are, etc. In one embodiment of the present invention, test computer 110 has access to the information in the database and the ability to interpret the information. In one exemplary implementation, when a test computer sends a configuration command to a test harness, test computer 110 uses the information in the database to determine which of the pins of DUT 130 are used as inputs and which are used as outputs for a particular configuration. For example, test computer 110 provides commands to testing environment component 120 indicating which pins of DUT 130 are configured as inputs and which are configured as outputs for a particular test. In another exemplary implementation, test computer 110 also provides information associated with the testing results to the database.

Figure 3:
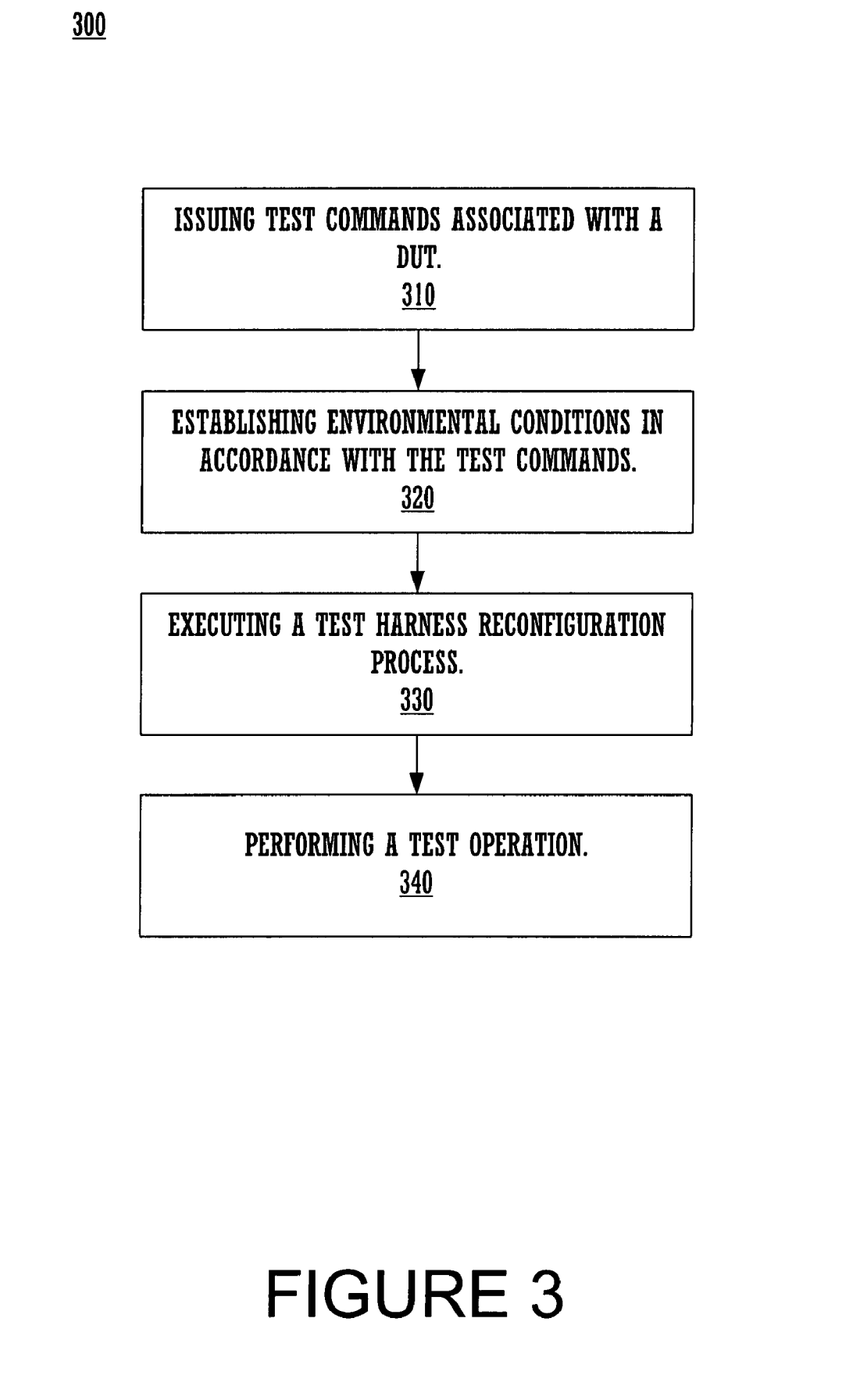
FIG. 3 is a flow chart of one embodiment of a reconfiguration testing method in accordance with the present invention.

FIG. 3 is a flow chart of reconfiguration testing method 300, one embodiment of a reconfiguration testing method in accordance with the present invention. Reconfiguration testing method 300 facilitates testing activities with a variety of objectives, including production testing, performance testing, characterization testing, and experimental testing. Reconfiguration testing method 300 also facilitates efficient and convenient testing of a DUT by enabling a DUT to be reconfigured and tested while remaining in a testing environment.

In step 310, test commands associated with a DUT are issued. In one embodiment of the present invention the test commands are issued by a test computer (e.g., test computer 110). In one embodiment the test commands request a configuration change in a DUT. In one exemplary implementation, a test command indicates that environmental conditions are to remain constant (even though the configuration is changed). In another exemplary implementation, a test command indicates the environmental conditions are changed (even though the configuration is not changed). In one exemplary implementation, received information is converted from a universal serial bus (USB) format to a serial peripheral interface (SPI) format and vice versa.

Environmental conditions are established in accordance with commands received in step 330. In one embodiment, a number of environmental conditions (e.g., temperature, humidity, power, etc.) are set. In one exemplary implementation, environmental conditions are established by a testing environment component (e.g., testing environment component 120).

At step 330, a test harness reconfiguration process is executed on the DUT. In one embodiment of reconfiguration testing method 300, the test harness reconfiguration process programmatically reconfigures the DUT while the DUT remains exposed to controlled environmental conditions (e.g., is coupled to testing environment component 120). In one embodiment, a test harness reconfiguration process includes dynamic reconfiguration of an integrated circuit (e.g., a programmable microcontroller). Additional details on an exemplary implementation of a dynamic reconfiguration of an integrated circuit are set forth in co-pending commonly-owned U.S. patent application Ser. No. 09/989, 817, filed Nov. 19, 2001, entitled "A SYSTEM AND METHOD OF DYNAMICALLY RECONFIGURING A PROGRAMMABLE INTEGRATED CIRCUIT," which is hereby incorporated by this reference.

In step 340, a testing operation is performed. In one embodiment, a testing operation includes providing the DUT with predetermined inputs and measuring the resulting DUT outputs. In one exemplary implementation, the testing operation includes a test operation to retrieve information on a characteristic (e.g., the frequency, the corner characteristics, a voltage, a current, etc.) of the DUT. In another exemplary implementation, the testing operation includes an experimental test operation designed to provide rapid feedback on a property or condition of the DUT.

Figure 4:
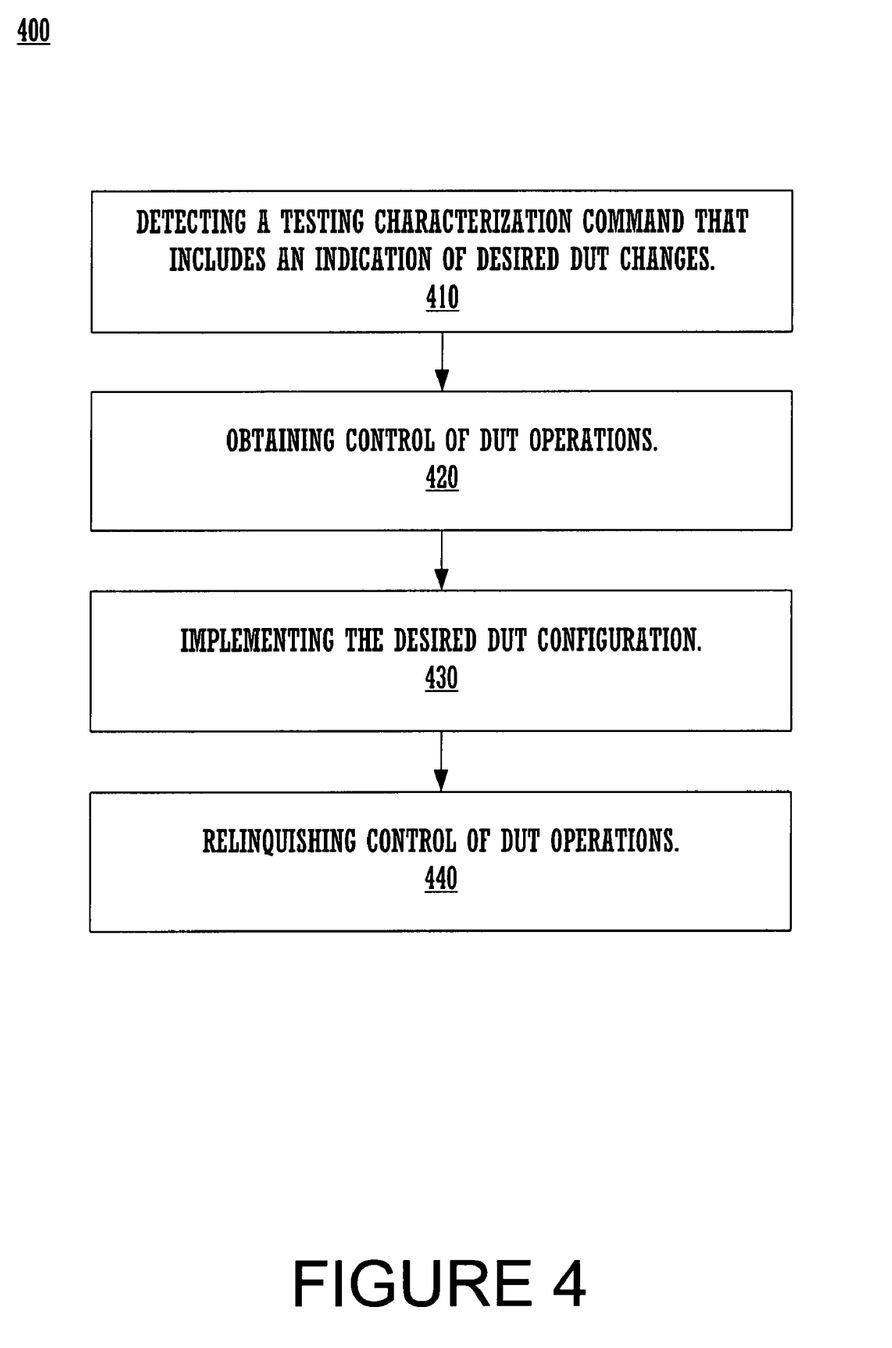
FIG. 4 is a flow chart of one embodiment of a present invention test harness reconfiguration process.

FIG. 4 is a flow chart of test harness reconfiguration process 400, one embodiment of a present invention test harness reconfiguration process. In one embodiment of the present invention, test harness reconfiguration process 400 is implemented in step 330 of reconfiguration testing method 300.

In step 410, a testing characterization command that includes an indication of desired DUT changes is detected. In one embodiment, the information (e.g., the characterization command) is communicated via a serial peripheral interface (SPI).

Control of DUT operations are obtained in step 420. In one embodiment, a test harness obtains control of the DUT operations and prevents other testing operations from interfering with test harness reconfiguration process 400.

At step 430, desired DUT configuration changes are implemented. In one embodiment of the present invention, values in configuration registers are changed to provide a desired DUT configuration. In one exemplary implementation, information from a configuration image (e.g., a configuration data set) is automatically loaded into configuration registers of a DUT (e.g., a target programmable integrated circuit). In one exemplary implementation, the configuration image is automatically loaded into configuration registers in response to an indication of desired DUT changes. In one embodiment, a configuration image that corresponds to an indication of the desired DUT changes is selected, the selected configuration image data (e.g., data sets) is retrieved from a memory (e.g., flash memory 15) and the configuration image data is loaded in a configuration register.

In step 440, control of the DUT operations is relinquished. In one embodiment, control of DUT operations is returned to a test environment component and test computer.

In one exemplary implementation of the present invention, configuration images are provided by an electronic device design tool (e.g., a programmable integrated circuit design tool) and loaded into a memory of the DUT (e.g., a flash memory). In one embodiment of the present invention a test harness utilizes the configuration images loaded in the memory to reconfigure the DUT. In one exemplary implementation, the test harness reconfigures the DUT in different layouts and the different layouts of the same function are tested (e.g., for worst or best case) and the data sheets are fed back into the design tool (e.g., to assist in picking an optimal layout). The design tool also facilitates configuration, programming, building, emulation and debugging of a customized device. In one exemplary implementation, the device is similar to integrated circuit 10 of FIG. 1 with a functional component 25 similar to that of FIG. 2A. Additional details on an exemplary implementation of a present invention design tool are set forth in co-pending commonly-owned U.S. patent application Ser. No. 09/989,570, filed Nov. 19, 2001, entitled "METHOD FOR FACILITATING MICROCONTROLLER PROGRAMMING", which is hereby incorporated by this reference, and U.S. patent application Ser. No. 09/989,819, filed Nov. 19, 2001, entitled "A SYSTEM AND METHOD FOR CREATING A BOOT FILE UTILIZING A BOOT TEMPLATE", which is also hereby incorporated by this reference.

Thus, the present invention provides convenient and efficient dynamic configuration of an electronic device (e.g., a programmable integrated circuit). A reconfigurable testing system and method facilitates convenient testing of an electronic device configured in a variety of arrangements. The reconfigurable testing system and method is compatible with a variety of types of testing procedures (e.g., characterization testing, experimental testing, production testing, etc.). An electronic device design of the present invention facilitates dynamic programmability that enables operationally smooth (e.g., "on the fly") changes in the configuration and/or functionality of the electronic device with minimal or no disruptions to testing activities. A reconfigurable testing system and method of the present invention facilitates rapid testing of components performing various functions in numerous different configurations with less resources than traditional systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A reconfigurable circuit testing system comprising:
   a bus for communicating data;
   a microprocessor for processing data, said microprocessor coupled to said bus;
   a programmable functional component coupled to said bus, wherein said programmable functional component includes a plurality of functional blocks programmable to provide a plurality of functions and configurations; and
   a memory for storing data including test harness instructions for directing testing of said functions and configurations and causing said programmable functional component to dynamically change said functions and configurations in accordance with said testing, said memory coupled to said bus.

2. The reconfigurable circuit testing system of claim 1, wherein said programmable system on a chip functional component includes:
   a programmable interconnect for coupling components to said bus;
   an analog functional block configurable to perform analog functions, said analog block coupled to said interconnect; and
   a digital functional block configurable to perform digital functions, said digital block coupled to said interconnect.

3. The reconfigurable circuit testing system of claim 2, wherein said characterization harness instructions cause changes in input/output values that define said programmable interconnect.

4. The reconfigurable circuit testing system of claim 1 further comprising:
   a testing computer for directing test activities; and
   a testing environment component for adjusting testing environment factors, including temperature, pressure or humidity, and performing as an interface between said a device under test and said testing computer.

5. The reconfigurable circuit testing system of claim 4 wherein said test computer provides testing environment instructions to said testing environment component, issues testing commands to said test harness and receives testing results from a testing environment component.

6. The reconfigurable circuit testing system of claim 1, wherein said memory stores a plurality of configuration images that define the configuration and functionality of said circuit.

7. The reconfigurable circuit testing system of claim 5, wherein activating different configuration images results in different values being loaded in configuration registers included said reconfigurable circuit.

8. The reconfigurable circuit testing system of claim 1, wherein said test harness instructions include instructions to:
   direct an implementation of a first function or configuration and collect a first set of test results; and
   direct an implementation of a second function or configuration and collect a second set of test results.

9. The reconfigurable circuit testing system of claim 1 wherein said test harness instructions take over control of the operations of said reconfigurable circuit and prevent other programs from interacting with said reconfigurable circuit while reconfiguration is being implemented.

10. The reconfigurable circuit testing system of claim 1 wherein said test harness instructions include instructions that direct changes in a peripheral input output space so that said circuit takes on characteristics of an indicated peripheral.

11. The reconfigurable circuit testing system of claim 1 wherein said test harness directs reconfiguration in accordance with test results.

12. A reconfiguration testing method comprising:
   issuing test commands;
   establishing environmental conditions in accordance with said commands, wherein said environmental conditions include temperature, pressure or humidity;
   executing a test harness reconfiguration process in which components other than a test harness component are directed to dynamically change functions or configurations and testing is performed in accordance with said changes; and
   performing a testing operation.

13. A reconfiguration testing method of claim 12 wherein a test command indicates that the environmental conditions are to remain constant.

14. A reconfiguration testing method of claim 12 wherein a test command indicates that the environmental conditions are to change.

15. A reconfiguration testing method of claim 12 wherein said test harness reconfiguration process programmatically reconfigures a device under test while said device under test remains exposed to controlled environmental conditions.

16. A reconfiguration testing method of claim 12 wherein said testing operation includes a test operation to retrieve information on a characteristic of a device under test.

17. A reconfiguration testing method of claim 12 wherein said test commands include a testing characterization command and said testing characterization command is converted from a universal serial bus (USB) format to a serial peripheral interface (SPI) format.

18. A test harness reconfiguration process comprising:
   detecting a test command that includes an indication of desired device under test configuration changes;
   obtaining control of a device under test operations;
   implementing said desired device under test configuration changes dynamically in accordance with said test command; and
   relinquishing control of said device under test operations.

19. The test harness method of claim 17 further comprising changing values in a configuration register.

20. The test harness method of claim 17 further comprising:
   selecting configuration image data that corresponds to an indication of said desired DUT changes;
   retrieving said configuration image data from a memory; and
   loading configuration image data in a configuration register.

* * * * *